US011125564B2

(12) United States Patent
Bagchi et al.

(10) Patent No.: US 11,125,564 B2
(45) Date of Patent: Sep. 21, 2021

(54) SYSTEM AND METHOD FOR DETERMINING COMPLIANT ROUTES FOR REPETITIVE TRIPS

(71) Applicant: Aeris Communications, Inc., San Jose, CA (US)

(72) Inventors: Anupam Bagchi, San Jose, CA (US); Anil Goel, New Delhi (IN); Subramanian Balakrishnan, San Jose, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 106 days.

(21) Appl. No.: 16/212,722

(22) Filed: Dec. 7, 2018

(65) Prior Publication Data

US 2019/0178648 A1  Jun. 13, 2019

Related U.S. Application Data

(60) Provisional application No. 62/596,316, filed on Dec. 8, 2017.

(51) Int. Cl.
*G01C 21/20* (2006.01)
*G01C 21/34* (2006.01)
*G06Q 10/06* (2012.01)

(52) U.S. Cl.
CPC ......... *G01C 21/20* (2013.01); *G01C 21/3453* (2013.01); *G06Q 10/063114* (2013.01)

(58) Field of Classification Search
CPC ............... G01C 21/20; G01C 21/3453; G06Q 10/063114
See application file for complete search history.

(56) References Cited

U.S. PATENT DOCUMENTS

| 6,839,627 | B1 | 1/2005 | Bauch |
| 8,660,740 | B2 | 2/2014 | Koniditsiotis |
| 9,217,646 | B2 | 12/2015 | Kornhauser |
| 2004/0128091 | A1* | 7/2004 | Delin ............... G01D 21/00 702/75 |
| 2004/0243285 | A1 | 12/2004 | Gounder |

(Continued)

FOREIGN PATENT DOCUMENTS

CN          105389639          3/2016

OTHER PUBLICATIONS

Navman, "Navman Wireless Upgrades Route Compliance Reports 726219", May 14, 2010, Ziff Davis Enterprise, Retrieved from: https://dialog.proquest.com/professional/docview/1066567343/fulltext/165BFBBA90F9A0BD5D/1?accountid=157282.

(Continued)

*Primary Examiner* — Peter D Nolan
*Assistant Examiner* — Ashley L Redhead, Jr.
(74) *Attorney, Agent, or Firm* — Brundidge & Stanger, P.C.

(57) ABSTRACT

A computer-implemented method and system for monitoring route compliance of moving devices are disclosed. The method for monitoring route compliance of moving devices includes determining parameters for a typical trip based on job description; defining compliance parameters for route compliance based on the determined parameters for the typical trip; comparing parameters of the trip for which compliance is to be determined to the defined compliance parameters; and determining if the trip for which compliance is to be determined falls within the defined compliance parameters.

18 Claims, 14 Drawing Sheets

(56) References Cited

U.S. PATENT DOCUMENTS

| | | |
|---|---|---|
| 2006/0212276 A1 | 9/2006 | Drumheller |
| 2012/0246039 A1 | 9/2012 | Fain et al. |
| 2015/0242944 A1* | 8/2015 | Willard .............. G06Q 30/0284 |
| | | 705/5 |
| 2016/0205238 A1 | 7/2016 | Abramson et al. |
| 2017/0140390 A1 | 5/2017 | Degeneffe |
| 2018/0059687 A1 | 3/2018 | Hayes |

OTHER PUBLICATIONS

GPS Tracker 2014, "GPS Tracking Compliance and Analytical Reporting" Apr. 25, 2014, Retrieved from: http://www.usfleettracking.com/blog/2014/04/25/gps-tracking-compliance-analytical-reporting.

PS Insight_2018, "Route Compliance Techniques", Oct. 9, 2018, Retrieved from: https://www.gpsinsight.com/news/route-compliance-techniques/.

M-hance_2012, "m-hance launches integrated mobile delivery management system; m-hance solution to enable supply chain organisations to reduce operating costs by up to 20%", MS Presswire, Nov. 22, 2012.,Retrieved from: https://dialog.proquest.com/professional/docview/1186323968/fulltext/165C3867567363E0377/2?accountid=157282.

Aaron_2013, "A safer journey: Paul's Hauling uses an integrated approach to drive route compliance", Aug. 30, 2013.,Retrieved from: https://dialog.proquest.com/professional/docview/1437125298/fulltext/165BFBBA90F9A0BD5D/3?accountid=157282.

Rhonda_2012, "GPS system to make it easier to track CCPS buses, students", Sep. 27, 2012.,Retrieved from: https://dialog.proquest.com/professional/docview/1080736114/fulltext/165BFBBA90F9A0BD5D/12?accountid=157282.

International Search Report and Written Opinion from International Application No. PCT/US18/64416 dated Mar. 21, 2019.

\* cited by examiner

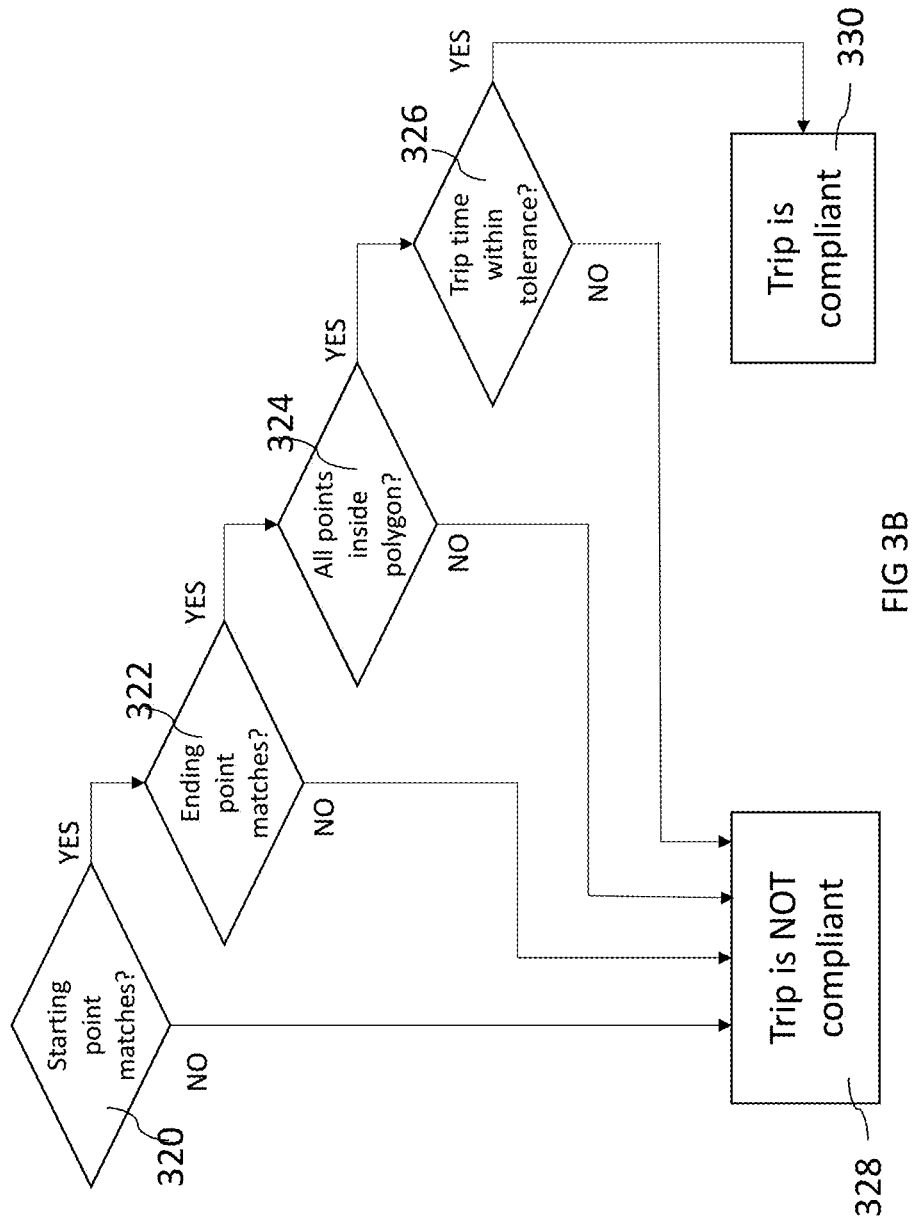

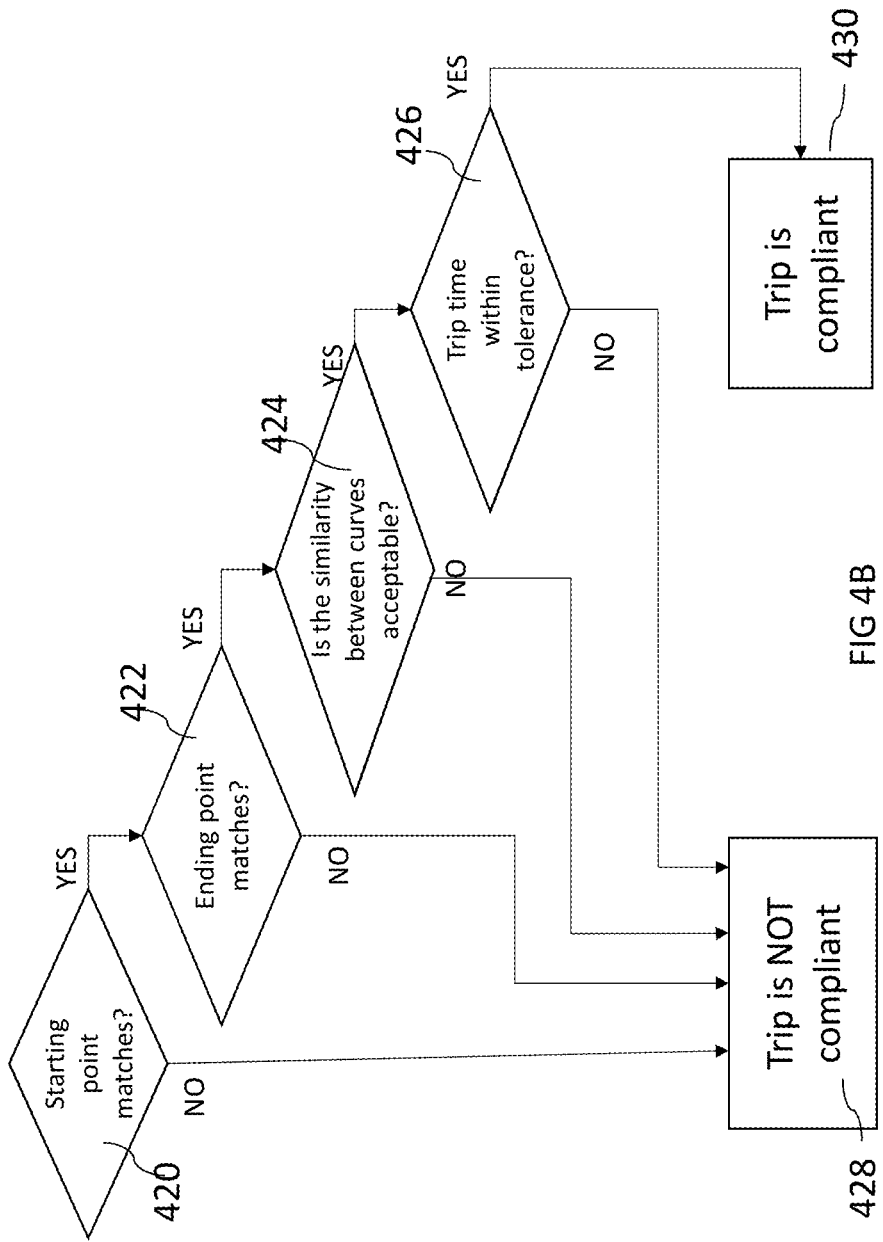

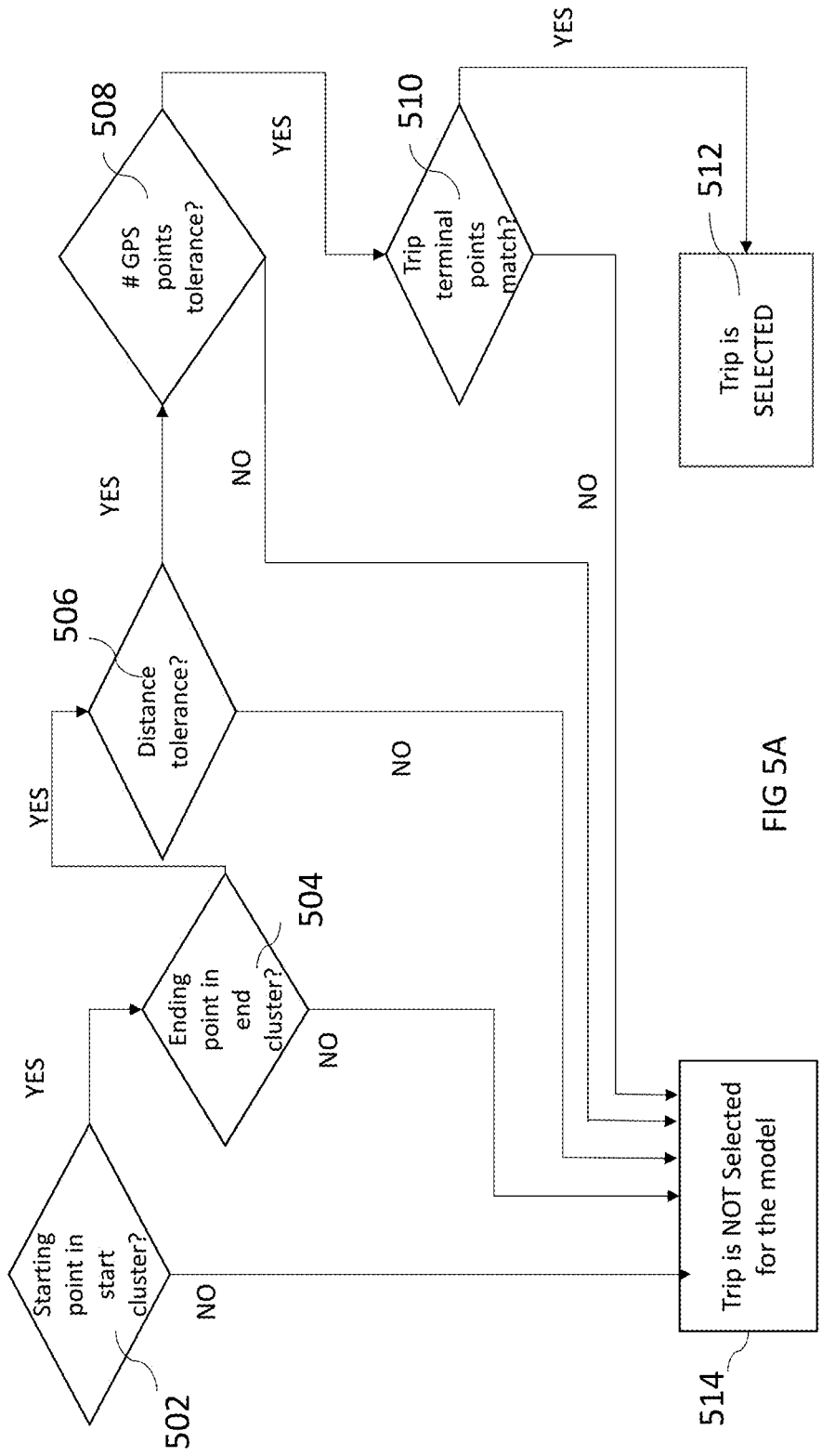

Example Report: Determining compliance of a trip

| Zone | Region | Area | Depot | Route Name | Vehicle ID | Start Time | End Time | Actual Time (Min) | Actual Distance (Km) | % Compliance |
|---|---|---|---|---|---|---|---|---|---|---|
| 1 | X | A | Aeris | AerisGoeit35160808S2234405_2017-115-26 08:32:13 | AerisGoeit35160808S2234405 | Wed Nov 15 2017 07:15:34 GMT+0530 (IST) | Wed Nov 15 2017 07:22:09 GMT+0530 (IST) | 6.3333333333 | 2.44 | 92.86771806 |
| 1 | X | A | Aeris | AerisGoeit35160808S2234405_2017-10-26 08:32:11 | AerisGoeit35160808S2234405 | Wed Nov 15 2017 20:54:23 GMT+0530 (IST) | Wed Nov 15 2017 20:57:59 GMT+0530 (IST) | 3.1 | 0.85 | 33.55648636 |
| 1 | X | A | Aeris | AerisGoeit35160808S2234405_2017-01-26 08:32:13 | AerisGoeit35160808S2234405 | Wed Nov 15 2017 20:59:15 GMT+0530 (IST) | Wed Nov 15 2017 21:04:13 GMT+0530 (IST) | 4.6333333333 | 1.15 | 24.05742377 |

FIG 5C

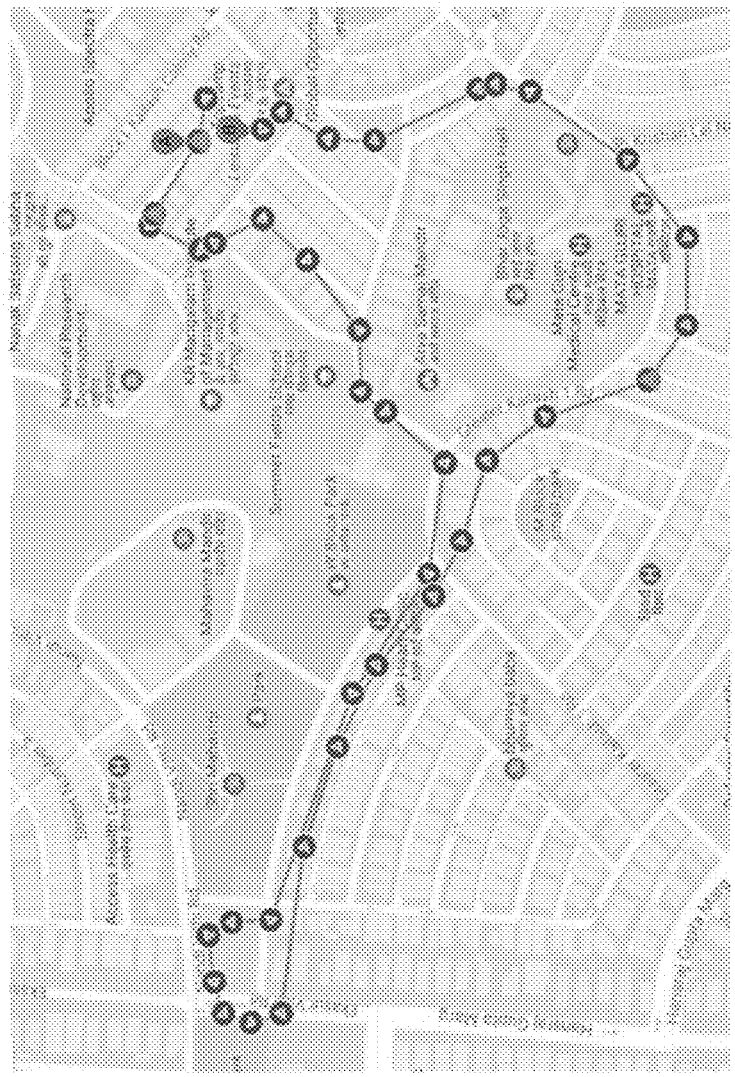

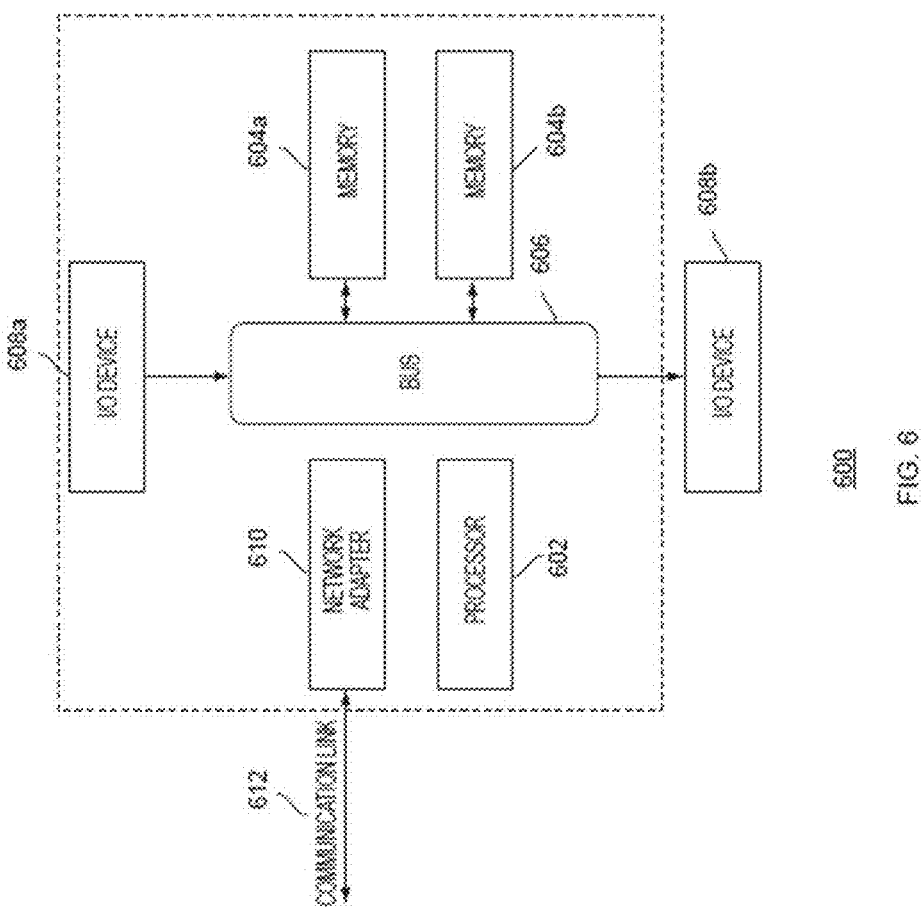

SYSTEM AND METHOD FOR DETERMINING COMPLIANT ROUTES FOR REPETITIVE TRIPS

CROSS-REFERENCE TO RELATED APPLICATIONS

Under 35 USC 119(e), this application claims priority to U.S. provisional application Ser. No. 62/596,316, entitled "SYSTEM AND METHOD FOR DETERMINING COMPLIANT ROUTES FOR REPETITIVE TRIPS", filed on Dec. 8, 2017.

FIELD OF THE INVENTION

The embodiments described herein relate generally to communication networks and more particularly to monitoring location and activity of devices that are capable of moving, connected to a wireless communications network, such as a cellular network, and that share other characteristics, for example, vehicles belonging to a commercial fleet of vehicles.

BACKGROUND

In many Internet-of-Things (IoT)/Machine-to-Machine (M2M) solutions, particularly running on moving machines, for example, vehicles, it may be useful to the fleet operator to track not only the vehicles, but who is driving, what job they are working on and/or the location of the vehicle.

SUMMARY

A computer-implemented method, system and computer program product for monitoring route compliance of moving devices are disclosed. The method for monitoring route compliance of moving devices includes determining parameters for a typical trip based on job description; defining compliance parameters for route compliance based on the determined parameters for the typical trip; comparing parameters of the trip for which compliance is to be determined to the defined compliance parameters; and determining if the trip for which compliance is to be determined falls within the defined compliance parameters.

The system for monitoring route compliance of moving devices includes a server including a storage database and an analytical engine, wherein the storage database receives and stores parameters for a typical trip based on job description for at least one moving device, and compliance parameters for route compliance based on the received parameters for the typical trip; and wherein the analytics engine compares parameters of the trip for which compliance is to be determined to the defined compliance parameters, and determines if the trip for which compliance is to be determined falls within the defined compliance parameters.

The computer program product stored on a non-transferable computer readable medium for monitoring route compliance of moving devices, comprising computer readable instructions for causing a computer to control an execution of an application for monitoring route compliance of moving devices includes determining parameters for a typical trip based on job description; defining compliance parameters for route compliance based on the determined parameters for the typical trip; comparing parameters of the trip for which compliance is to be determined to the defined compliance parameters; and determining if the trip for which compliance is to be determined falls within the defined compliance parameters.

BRIEF DESCRIPTION OF THE DRAWINGS

FIG. 3B illustrates is an example process flow of the method for monitoring route compliance of devices according to an embodiment described in FIG. 3A.

FIG. 4B illustrates is an example process flow of the method for monitoring route compliance of devices according to an embodiment described in FIG. 4A.

FIG. 5A is an example process flow of the method for monitoring route compliance of devices according to an embodiment described herein.

FIG. 5C illustrates an example report as percentage compliance for determining route compliance of a trip.

FIG. 5D illustrates an example view of route used for monitoring route compliance of devices according to an embodiment described herein.

FIG. 6 illustrates a data processing system 600 suitable for storing the computer program product and/or executing program code relating to the choices of the users in accordance with an embodiment of the present invention.

DETAILED DESCRIPTION

Figure 1:
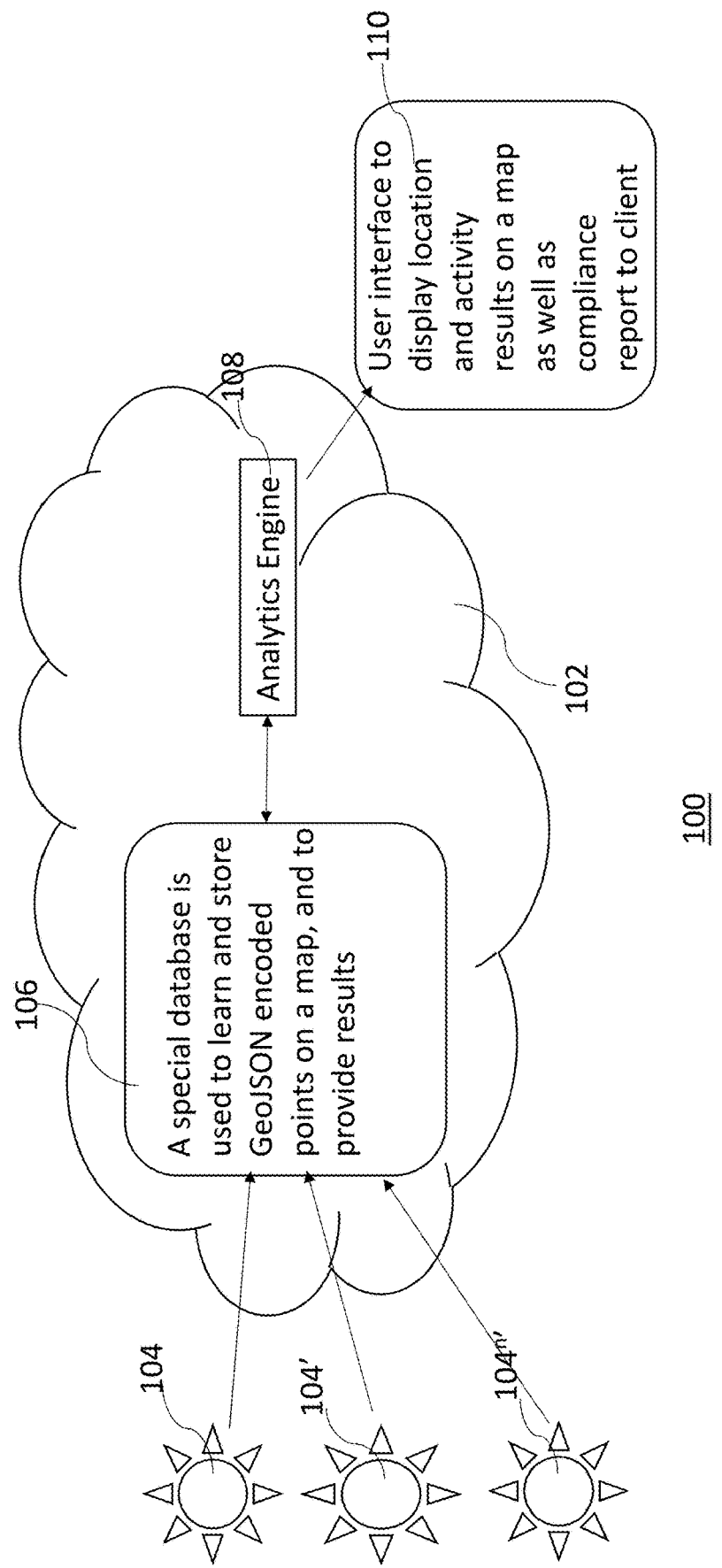
FIG. 1 illustrates an overview diagram for the method and system for monitoring route compliance of devices according to one or more embodiments described herein.

The embodiments described herein relate generally to communication networks and more particularly to monitoring location and activity of devices that are capable of moving, connected to a wireless communications network, such as a cellular network, and that share other characteristics, such as belonging to a commercial fleet of vehicles.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Many Internet-of-Things (IoT)/Machine-to-Machine (M2M) solutions, particularly running on moving machines, for example, vehicles, it may be useful to the fleet operator to track not only the vehicles, but who is driving, what job they are working on and/or the location of the vehicle.

Operators of the mobile devices, for example, driver of the vehicles performing jobs may not have access to cellular connectivity throughout their job performance, in which case status of the job may be tracked or monitored using location of the vehicle. The location of the vehicle may provide information whether the vehicle is at a depot, at a pick up location, in transit or a drop off location and based on this information, status of the assigned job may be deduced.

A job may be defined as an activity of taking a particular load from one location to another location or may include pick up from multiple locations and deliveries to multiple locations using one or more vehicles. Once a job is received, the information regarding the job is entered into the monitoring system including a starting point of the job, an end point of the job, or multiple pickup and drop-off points during a particular job, vehicle information for the vehicle assigned to a particular job, driver information for the driver assigned to a particular job, expected start time of the job, expected end time of the job, information of the customer providing the job, etc. For example, the display on the user interface may show any or all of: driver A is driving vehicle B at time XX, performing job Y job, and the current job status is Z.

Connected commercial vehicles are often required to perform repetitive tasks on the same route. These routes may be called 'job' routes since each trip may be counted as a job on which payments to drivers or sales agents are based on. The vehicles on the job can also be used for other tasks while they are free. This invention describes a method to distinguish job-routes from non-job routes. In other words, this methodology can be used to identify trips that are compliant to a certain job description. The job descriptions for routes are usually programmed into the system beforehand, and compliance is checked after completion of each trip or at the end of the day.

To describe the features of the present invention in more detail within the context of products such as SIMs installed in the IoT devices, for example, vehicles, refer to the accompanying figures in conjunction with the following discussions. These examples are used for purpose of illustration only, and should not be construed as limitations.

The embodiments described herein disclose a computer-implemented method, system and computer program product for monitoring route compliance of moving devices.

The method for monitoring route compliance of moving devices includes determining parameters for a typical trip based on job description; defining compliance parameters for route compliance based on the determined parameters for the typical trip; comparing parameters of the trip for which compliance is to be determined to the defined compliance parameters; and determining if the trip for which compliance is to be determined falls within the defined compliance parameters.

The system for monitoring route compliance of moving devices includes a server including a storage database and an analytical engine, wherein the storage database receives and stores parameters for a typical trip based on job description for at least one moving device, and compliance parameters for route compliance based on the received parameters for the typical trip; and wherein the analytics engine compares parameters of the trip for which compliance is to be determined to the defined compliance parameters, and determines if the trip for which compliance is to be determined falls within the defined compliance parameters.

The computer program product stored on a non-transferable computer readable medium for monitoring route compliance of moving devices, comprising computer readable instructions for causing a computer to control an execution of an application for monitoring route compliance of moving devices includes determining parameters for a typical trip based on job description; defining compliance parameters for route compliance based on the determined parameters for the typical trip; comparing parameters of the trip for which compliance is to be determined to the defined compliance parameters; and determining if the trip for which compliance is to be determined falls within the defined compliance parameters.

The system and method for monitoring route compliance of devices using location and activity of the devices connected to the cellular network described herein can track routes used for the job by the moving devices, for example, IoT devices such as vehicles. The moving devices described herein may include one or more communication devices, for example, vehicles connected to the cellular network or cellular-enabled devices via SIMs that are installed in the communication devices either integrated in the vehicle itself or removably installed in the vehicle.

The route compliance monitoring described herein may be performed in two steps: 1. Finding a 'typical' job description from a few samples or trial trips made by the user. This representative job could be a single instance or a select few instances that should all be considered typical jobs. 2. Checking if the current route in question (ongoing or just-finished) is compliant with the typical job description provided above. Different approaches may be used to determine route compliance.

For example, for determining a typical trip, data for at least one trip for a typical job description is gathered by the system and parameters for the typical trip are determined including any one or more of starting point of the trip, ending point of the trip, length of the trip, expected time of completion of the trip, location points on the route. The compliance parameters for monitoring route compliance are defined, which may include providing tolerance values for variance in the determined parameters for the typical trip.

The system and method may also monitor route compliance of moving devices for different customers. The fleet operators, also known as the subscribers may also provide access to their customers for whom the jobs are being performed so that they can see the vehicles that are performing their jobs and also know the route compliance for those vehicles.

The methodology may be used in applications involving moving commercial vehicles performing repetitive tasks. Automated analysis of device data collected does not require the user to manually log every trip, saving time and unnecessary account-keeping. This system can be integrated with the fleet owner's accounting system allowing them to make payments to drivers or sales agents without manual entry of data into their system. This approach may be used for applications including, but not limited to the following: sales agents giving test-rides to their customers on pre-determined routes, commercial truck drivers picking up goods from pre-defined locations and dropping them off at a different location, parents monitoring the route taken by their teenage children, taxi companies monitoring the routes taken by their drivers along popular routes, city bus owners monitoring trips taken by buses for specific routes within the city, tour operators monitoring their tourist buses for compliant tour routes.

FIG. 1 is an overview diagram for the method and system for monitoring route compliance of devices according to one or more embodiments described herein. The embodiments described herein involve usage of a computer to record the position and direction of a moving vehicle in real-time as it moves on the road. Based on the pattern of movement, the gathered data is analyzed to assess the kind of task performed by the device/vehicle. A special kind of encoding called GeoJSON may be used to represent location points on a map. A special database may be used to handle GeoJSON encoded location points on a map, and to provide results in an efficient and meaningful manner. Any other type of database that is capable of supporting location information may also be used.

FIG. 1 illustrates system configuration 100 including mobile devices 104, 104' . . . 104''', a data processing system 102 including a database 106, analytics engine 108, and a user interface 110. A system for monitoring route compliance of devices includes a storage database 106, wherein the storage database 106 receives location information from the mobile device 104 and job assignment information for the mobile devices 104; an analytics engine 108, wherein the analytics engine 108 evaluates the location information to determine the route compliance for the at least one IoT device based on a specified condition.

The mobile devices 104, 104', . . . 104''' for example, IoT devices may include communication devices, for example, vehicles connected to the cellular network or cellular-enabled devices via SIMs that are installed in the communication devices either integrated in the vehicle itself or removably installed in the vehicle on each of the fleet vehicles. These communication devices could be devices using a radio module and Wifi, or any other wireless communication technology that are capable of transmitting relevant vehicle data to database 106 and/or the data processing system 102 of the monitoring system.

Figure 2:
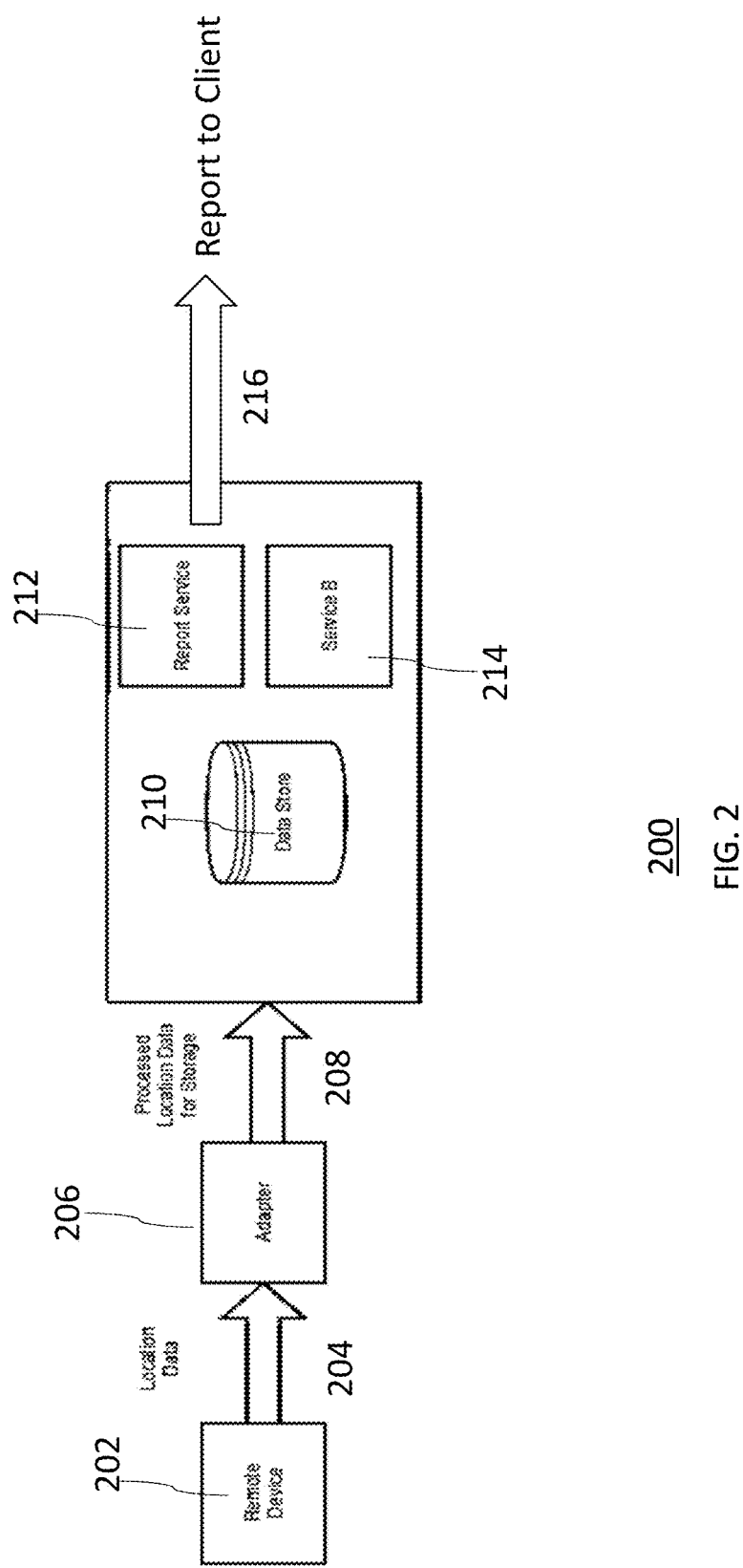
FIG. 2 is an example system configuration and process flow for the method and system for monitoring route compliance of devices according to one or more embodiments described herein.

FIG. 2 is an example system configuration and process flow for the method and system for monitoring route compliance of devices according to one or more embodiments described herein. In an embodiment, the system for providing job status information for one or more IoT devices such as mobile devices, for example, vehicles, includes a storage database 210, wherein the storage database receives location information of the at least one IoT device 202 via steps 204 and 208 and job assignment information for the at least one IoT device 202; an analytics engine, wherein the analytics engine evaluates the location information to determine the route compliance for the at least one IoT device based on a specified condition; and a report service 212 that compiles the data into a meaningful report and presents it to the user via step 216. The IoT device 202 may include a communication device, for example, vehicles connected to the cellular network or cellular-enabled devices via SIMs that are installed in the communication devices either integrated in the vehicle itself or removably installed in the vehicle.

Alternatively or additionally, the method and system may also track route compliance of a device for different customers.

Figure 3A:
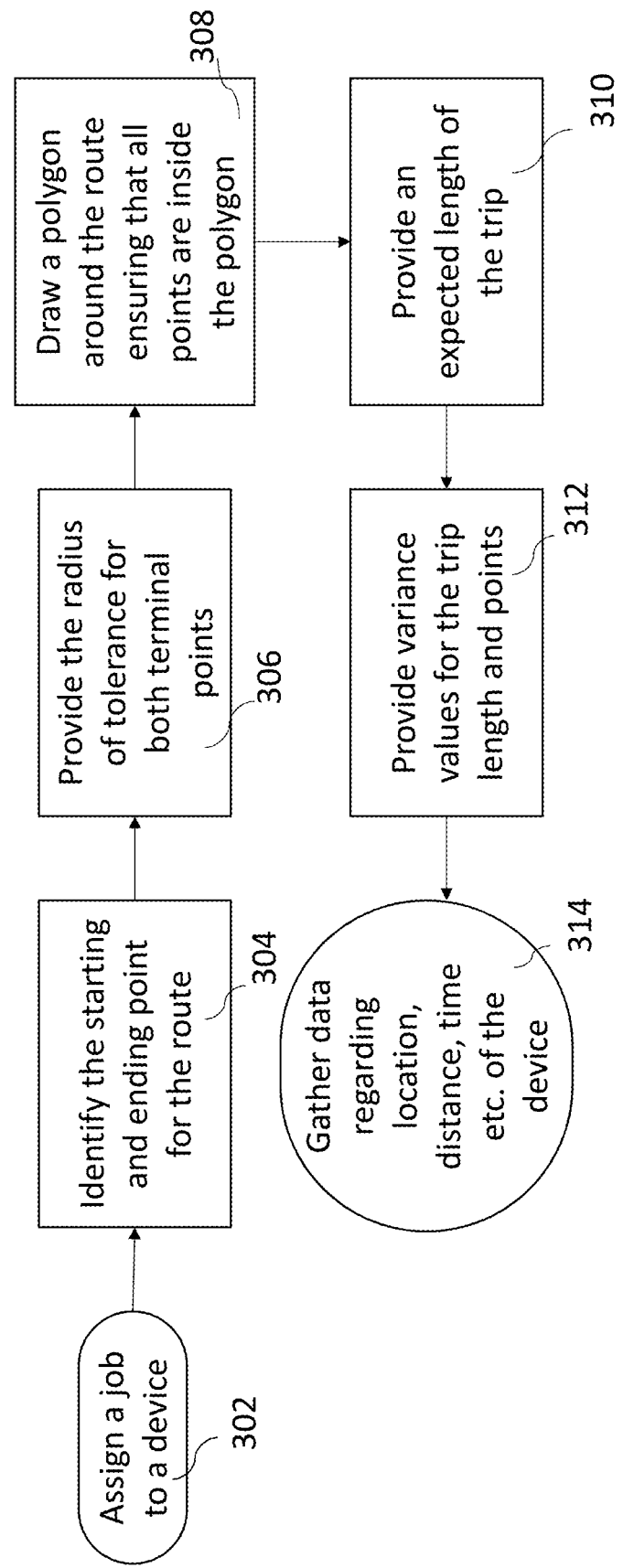
FIG. 3A is an example process flow of the method for monitoring route compliance of devices according to an embodiment described herein.

FIG. 3A is an example process flow of the method for monitoring route compliance of mobile devices according to an embodiment described herein.

In an embodiment, for example, approach 1, the simplest of all approaches may be based on creating a polygon around the path of interest. This polygon can be drawn manually by the user, or inferred from a typical trip. Once the polygon is created, the check for compliance is based on checking if all points are within this defined polygon.

The routes used for the jobs may be described by providing the information including but not limited to: starting location of the route involving the job, ending location of the route involving the job. For jobs that end at the same place, the ending location and the starting location are the same. The information may further include a radius of tolerance around each terminal point of the route which may be the starting point, the ending point or any other location point on the route. This radius is used to establish a geo-fence around each terminal point whereby any presence of the vehicle inside the geo-fence indicates that the vehicle is at the starting point or has reached the ending point.

Figure 3C:
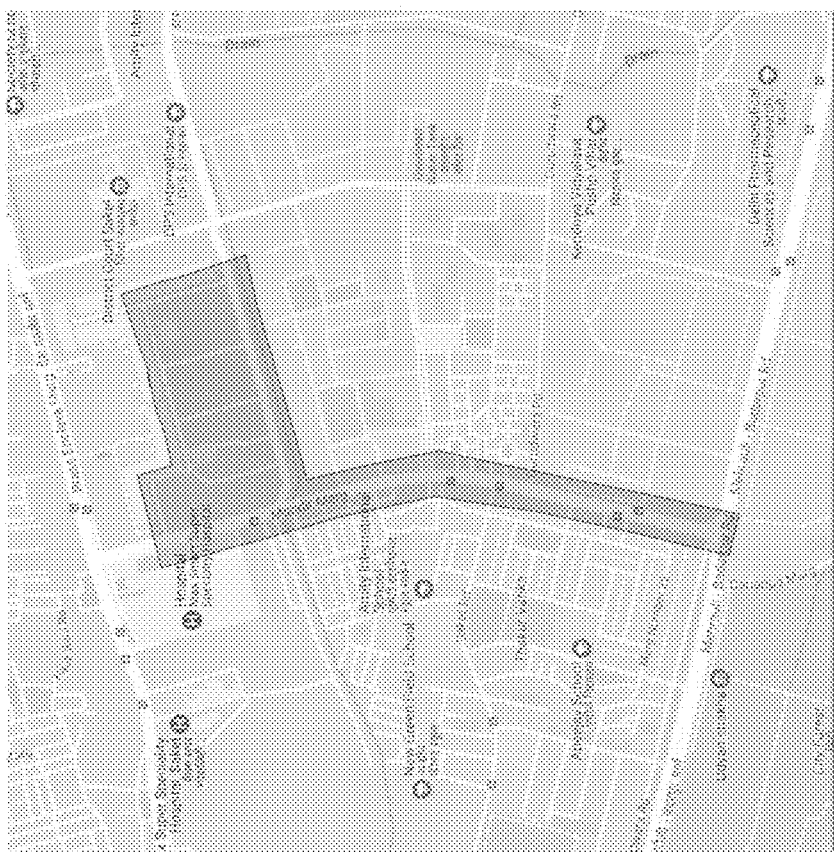
FIGS. 3C, 3D and 3E illustrate example views of route used for monitoring route compliance of devices according to an embodiment described herein.
Figure 3D:
Figure 3E:
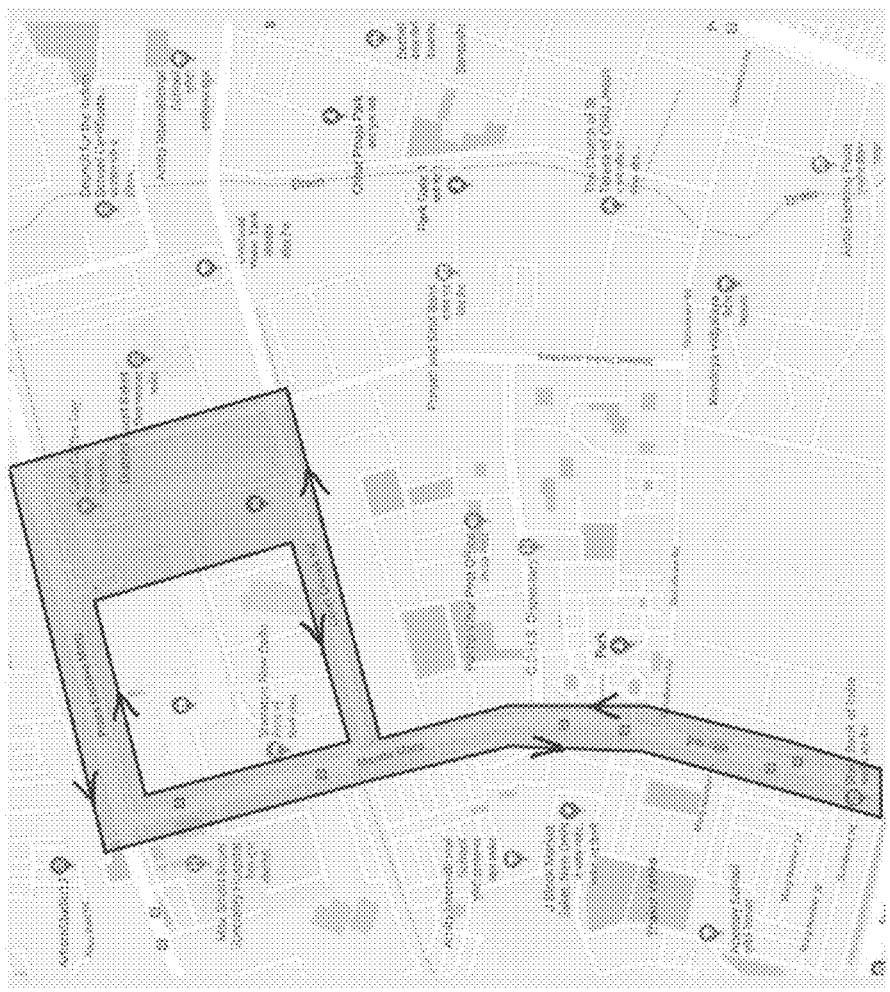

The information may further include a polygon surrounding the route whereby all points along the routes must fall 'inside' the polygon. This polygon may be described in one of three ways: one polygon surrounding the entire area covering the route including all regions inside it as shown in FIG. 3C, for example, a crescent-shaped polygon which only surrounds the actual route but eliminates all other regions inside it as shown in FIG. 3D, or a combination of two or more polygons where the exterior polygon encompasses the entire region where the route falls in, and the other polygons inside it describing 'holes' or areas that need to be eliminated from the exterior polygon as shown in FIG. 3E. Other types and shapes of polygons may also be used.

The information may further include an expected length of the route to complete the job, an acceptable variance of length for completing the job, which may be expressed as a percentage, an acceptable variance of non-containment of points within the defined geo-fence, which may be expressed as a percentage.

In an embodiment, the method for monitoring route compliance of devices starts by defining compliance parameters of a trip. One or more devices are assigned one or more jobs either manually or via automated job assignment using an application for assigning jobs based on different parameters such as but not limited to availability of the devices, size of load to match with the vehicle, proximity of the devices to the pick-up location, device score, driver score etc. via step 302. Once the job is assigned to the device, the starting point and ending point for the route pertaining to the assigned job is identified via step 304. A radius of tolerance for both terminal points as well as intermediate points may be provided as a predetermined criteria for tolerance of deviation from the route. A polygon may then be drawn around the location points of the route ensuring that all location points on the route are inside the polygon via step 308. An expected length of the trip for the assigned job may be provided as a predetermined criteria for route compliance via step 310. One or more values of variance values may be provided as an acceptable deviation in the length/time for the trip and/or location points via step 312. The variance values may be provided by the application itself or may be provided by a user/entity responsible for monitoring route compliance.

As the device moves from one location point to another, the data related to the parameters discussed above is gathered and analyzed via step 314 and route compliance of the moving device is determined by analyzing the gathered data as described in FIG. 3B.

FIG. 3B illustrates is an example process flow of the method for monitoring route compliance of devices according to an embodiment described in FIG. 3A.

Determination of compliance depends on satisfaction of the following requirements; 1. The job must start at the designated starting location within the given radius of tolerance. 2. The job must end at the designated ending location within the given radius of tolerance. 3. The length of the trip must match the expected time of completion, within the acceptable variance value. 4. The percentage of points during the trip that fall outside the defined geo-fence polygon must be within the provided variance value. If ALL the above four conditions are satisfied, the route is marked as compliant. The algorithm below depicts the steps necessary for checking compliance.

To determine of the route is compliant, the system checks if the starting point matches with the starting point of the job assigned to the device as entered in the system via step 320. If the starting point does not match, the trip is marked as non-compliant via step 328. If the starting points match the algorithm further checks if the ending point matches with the ending point of the job assigned to the device as entered in the system via step 322. If the ending point does not match, the trip is marked as non-compliant via step 328. If the ending points match the algorithm further checks if all location points during the trip are inside the polygon, or the geofence defined via step 324. If all the location points are not inside the defined geofence, the trip is determined to be non-compliant via step 328. If all the location points are inside the defined geofence, the algorithm further checks if the trip time recorded is within the tolerance limits defined in the system via step 326. If the trip time is not within the tolerance limits defined in the system, the trip is determined to be non-compliant via step 328. If the trip time is within the tolerance limits defined in the system, the trip is determined to be compliant via step 330.

FIGS. 3C, 3D and 3E illustrate exemplary polygons surrounding the route whereby all points along the routes must fall 'inside' the polygon. This polygon may be described in one of three ways: one polygon surrounding the entire area covering the route including all regions inside it as shown in FIG. 3C, for example, a crescent-shaped polygon which only surrounds the actual route but eliminates all other regions inside it as shown in FIG. 3D, or a combination of two or more polygons where the exterior polygon encompasses the entire region where the route falls in, and the other polygons inside it describe 'holes' or areas that need to be eliminated from the exterior polygon as shown in FIG. 3E.

Figure 4A:
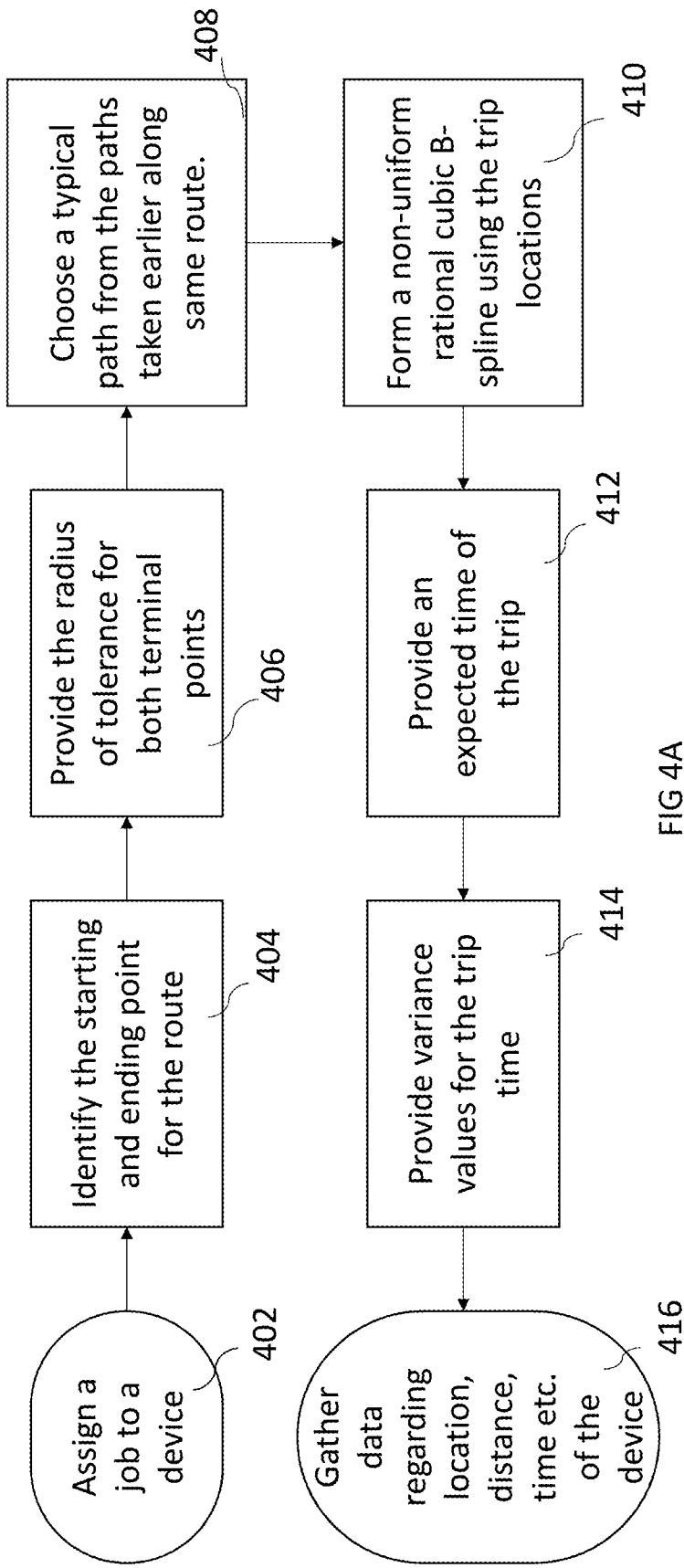
FIG. 4A is an example process flow of the method for monitoring route compliance of devices according to an embodiment described herein.

FIG. 4A is an example process flow of the method for monitoring route compliance of devices according to an embodiment described herein.

In an embodiment, for example, approach 2 may be based on using similarity between two curves. This approach is based on finding similarity between two curves on a two-dimensional plane. A typical path is treated as a singular 'representative sample'. This sample is then parameterized into a non-uniform rational cubic B-spline representation. For checking compliance, the similarity between the two paths is found using a root-mean-square method with small increments of the parameter 't' (parametric distance) along the curve. Additional checks like starting point match, ending point match and time taken to execute the trip are also performed for verification.

The routes used for the jobs may be described by providing the information including but not limited to: starting location of the route involving the job, ending location of the route involving the job. For jobs that end at the same place, the ending location and the starting location are the same. The information may further include a radius of tolerance around each terminal point of the route which may be the starting point, the ending point or any other location point on the route. This radius is used to establish a geo-fence around each terminal point whereby any presence of the vehicle inside the geo-fence indicates that the vehicle is at the starting point or has reached the ending point.

The information may further include a 'typical' route taken by the vehicle. This is the 'representative trip' that will be used for building the curve with which similarity be found against. An acceptable value of similarity for compliance checking may be normalized to be between 0 and 1.

The information may further include an expected length of the route to complete the job, an acceptable variance of length for completing the job, which may be expressed as a percentage, an acceptable variance of non-containment of points within the defined geo-fence, which may be expressed as a percentage.

In an embodiment, the method for monitoring route compliance of devices starts by defining compliance parameters of a trip. One or more devices are assigned one or more jobs either manually or via automated job assignment using an application for assigning jobs based on different parameters such as but not limited to availability of the devices, size of load to match with the vehicle, proximity of the devices to the pick-up location, driver score etc. via step 402.

Once the job is assigned to the device, the starting point and ending point for the route pertaining to the assigned job is identified via step 404. A radius of tolerance for both terminal points as well as intermediate points may be provided as a predetermined criteria for tolerance of deviation from the route via step 406. A typical path from the paths taken earlier along same route may be chosen via step 408. A non-uniform rational cubic B-spline using the trip locations may be formed via step 410.

An expected length of the trip for the assigned job may be provided as a predetermined criteria for route compliance via step 412. One or more values of variance may be provided as an acceptable deviation in the length, for example, distance and/or time, for the trip and/or location points via step 414.

As the device moves from one location point to another, the data related to the parameters discussed above is gathered via step 416 and route compliance of the moving device is determined by analyzing the gathered data as described in FIG. 4B.

FIG. 4B illustrates is an example process flow of the method for monitoring route compliance of devices according to an embodiment described in FIG. 4A.

Determination of compliance depends on satisfaction of the following requirements; 1. The job must start at the designated starting location within the given radius of tolerance. 2. The job must end at the designated ending location within the given radius of tolerance. 3. The length, distance and/or time, of the trip must match the expected time of completion, within the acceptable variance value. 4. The similarity between the two curves must be within an acceptable limit. If ALL the above four conditions are satisfied, the route is marked as compliant. The algorithm below depicts the steps necessary for checking compliance.

To determine of the route is compliant, the system checks if the starting point matches with the starting point of the job assigned to the device as entered in the system via step 420. If the starting point does not match, the trip is marked as non-compliant via step 428. If the starting points match the algorithm further checks if the ending point matches with the ending point of the job assigned to the device as entered in the system via step 422. If the ending point does not match, the trip is marked as non-compliant via step 428. If the ending points match the algorithm further checks if the similarity between the curves is within the acceptable predetermined limit via step 424. If the similarity between the curves is not within the acceptable predetermined limit, the trip is determined to be non-compliant via step 428. If the similarity between the curves is within the acceptable predetermined limit, the algorithm further checks if the trip time recorded is within the tolerance limits defined in the system via step 426. If the trip time is not within the tolerance limits defined in the system, the trip is determined to be non-compliant via step 428. If the trip time is within the tolerance limits defined in the system, the trip is determined to be compliant via step 430.

FIG. 5A is an example process flow of the method for monitoring route compliance of devices according to an embodiment described herein.

In an embodiment, for example, approach 3 may be based forming a cluster of GPS locations from several trips. This approach is based on creating a cluster of points by using the GPS coordinates from several sample trips taken together. The key to this approach is to select enough trips that forces the density-based clustering algorithm to include every GPS point from all trips as part of a named cluster. In other words, there should not be any point outside of a cluster from the sample trips taken. This is possible if a lot of sample trips are used to create the cluster. This becomes our learned data model. For compliance checking the test route in question is included as an extension of the input points for the same clustering algorithm, and ensure that the labels associated with the new route points all happen to be part of an old cluster. If any point in the new route falls outside any cluster, we consider that route to be non-compliant.

The routes used for the jobs are provided by marking few of the existing trips taken by the device/vehicle as representative trips for the job and may be described by providing the information including but not limited to: starting location of the route involving the job, ending location of the route involving the job. For jobs that end at the same place, the ending location and the starting location are the same. The information may further include a radius of tolerance around each terminal point of the route which may be the starting point, the ending point or any other location point on the route. This radius is used to establish a geo-fence around each terminal point whereby any presence of the vehicle inside the geo-fence indicates that the vehicle is at the starting point or has reached the ending point.

The information may further include GPS points captured along the path while executing the job. FIG. 5C illustrates the starting point A and the ending point B of the route. Information points collected along the route are marked with arrows on the map.

The information may further include distance travelled to complete the job, and time taken to complete the job. An acceptable variance of distance and time for completing the job, which may be expressed as a percentage, an acceptable variance of non-containment of points within the defined geo-fence, which may be expressed as a percentage.

This approach involves learning model routes for job compliance as follows. For learning model routes, a few representative job routes are selected and fed into a density-based clustering algorithm. Enough sample trips are taken so that every point of each trip is part of some cluster (i.e. no exclusions). This can also be achieved by either tuning the algorithm parameters or feeding enough sample trips to the system or by a combination of both. A stochastic model is thus created where every point becomes part of a named cluster.

The selection of representative trips is done based on matching starting point, matching ending point, and matching time and length of trip, all within a pre-determined tolerance value. This selection may be done manually through a user-interface, or automatically by running simple proximity checks as described in Approach 1, illustrated by FIG. 3A and described in detail in the description accompanying FIG. 3A.

The trip selection algorithm for building stochastic model to determine job compliance is illustrated in FIG. 5A. In an embodiment, the method for selecting a trip for building stochastic model starts by checking if the starting point of the trip to be selected is in the start cluster via step 502. If the starting point falls outside the start cluster, the trip is not selected to be used as a model. If the starting point falls within a known cluster, the algorithm further checks if the ending point falls within a ending cluster via step 504. If the ending point falls outside the ending cluster, the trip is not selected to be used as a model. If the ending point falls within the cluster, the algorithm further checks for the distance tolerance via step 506. If the distance tolerance is not within the acceptable predetermined limit, the trip is not selected to be used as a model. If the distance tolerance is within the acceptable predetermined limit, the algorithm further checks for the number of GPS points tolerance via step 508. If the number of GPS points tolerance is not within the acceptable predetermined limit, the trip is not selected to be used as a model. If the number of GPS points tolerance is within the acceptable pre-determined limit, the algorithm further does a confirmatory check to ensure that the starting and ending points are within the assigned geo-spaces of the known starting and ending location of the trip. If the trip terminal points fail to satisfy that condition, the trip is not selected to be used as a model. If the trip terminal points match, the trip is selected to become a sample trip in the model.

Figure 5B:
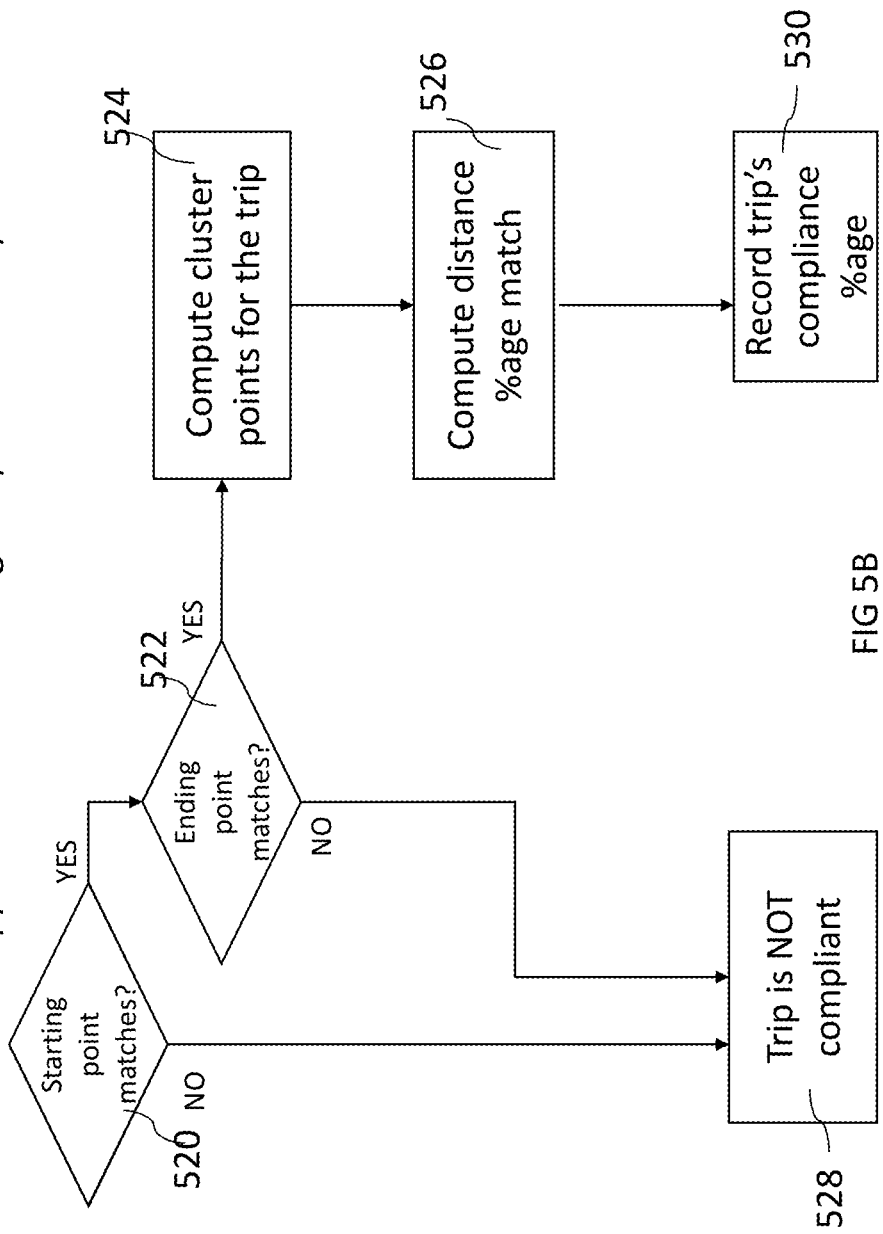
FIG. 5B illustrates is an example process flow of the method for monitoring route compliance of devices according to an embodiment described in FIG. 5A.

As the device moves from one location point to another, the data related to the parameters discussed above is gathered for the trip for which route compliance determination is to be made, and route compliance of the moving device is determined by analyzing the gathered data as described in FIG. 5B.

FIG. 5B illustrates is an example process flow of the method for monitoring route compliance of devices according to an embodiment described in FIG. 5A.

Determination of compliance using this approach may be computed as a percentage. To do the compliance check, the following tests are performed: 1. Check if the job ends at the designated starting location within the given radius of tolerance. 2. Check if the job starts at the designated ending location within the given radius of tolerance. 3. Create a new expanded set of input points by including the original GPS locations from the sample routes and the test routes' GPS locations. 4. Run the clustering algorithm on this expanded set and check the labels associated with the GPS locations of the new route. If the labels on the new locations match the cluster Ids of old clusters, then the new route is indicated to be compliant. The algorithm below depicts the steps necessary for checking compliance using approach 3.

To determine of the route is compliant, the system checks if the starting point matches with the starting point of the job assigned to the device as entered in the system via step 520. If the starting point does not match, the trip is marked as non-compliant via step 528. If the starting points match the algorithm further checks if the ending point matches with the ending point of the job assigned to the device as entered in the system via step 522. If the ending point does not match, the trip is marked as non-compliant via step 528. If the ending points match the algorithm further computes cluster points for the trip via step 524. The algorithm further computes the distance percentage match via step 526. The route compliance of the trip is then calculated and recorded via step 530.

FIG. 5C illustrates an example report as percentage compliance for determining route compliance of a trip.

FIG. 5D illustrates the starting point A and the ending point B of the route. Information points collected along the route are marked with arrows on the map and used for percentage compliance determination of a trip. A cluster of GPS locations from several trips is illustrated by FIG. 5D.

FIG. 6 illustrates a data processing system 600 suitable for storing the computer program product and/or executing program code in accordance with an embodiment of the present invention. The data processing system 600 includes a processor 602 coupled to memory elements 604*a-b* through a system bus 606. In an embodiment, the data processing system 600 may include more than one processor and each processor may be coupled directly or indirectly to one or more memory elements through a system bus.

Memory elements 604*a-b* can include local memory employed during actual execution of the program code, bulk storage, and cache memories that provide temporary storage of at least some program code in order to reduce the number of times the code must be retrieved from bulk storage during execution. As shown, input/output or I/O devices 608*a-b* (including, but not limited to, keyboards, displays, pointing devices, etc.) are coupled to the data processing system 600. I/O devices 608*a-b* may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-13 read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

We claim:

1. A computer-implemented method for monitoring route compliance of moving devices, the method comprising:
    determining parameters for a typical trip based on job description;
    defining compliance parameters for route compliance based on the determined parameters for the typical trip including a non-uniform rational cubic B-spline representation of the typical path;
    gathering location data for moving devices for a trip for which compliance is to be determined, wherein gathering location data for moving devices for a trip further comprises collecting data using at least one communications device installed in each of the moving devices, and wherein the at least one communications device is capable of transmitting relevant moving device data to a database, a data processing system or a combination thereof of a monitoring system;
    comparing parameters of the trip including a non-uniform rational cubic B-spline representation of the trip for which compliance is to be determined to the defined compliance parameters;
    determining if the trip for which compliance is to be determined falls within the defined compliance parameters; and compiling the data into a report and presenting it via user interface.

2. The computer-implemented method of claim 1, wherein determining the typical trip comprises gathering data for at least one trip for a job description.

3. The computer-implemented method of claim 1, wherein the typical trip is treated as a representative sample.

4. The computer-implemented method of claim 1, wherein the determined parameters for the typical trip include any one or more of starting point of the trip, ending point of the trip, length of the trip, expected time of completion of the trip, location points on the route.

5. The computer-implemented method of claim 4, wherein the trip is determined to be compliant if: the starting point of the trip is within a radius of tolerance, the ending point of the trip is within a radius of tolerance, the length of the trip matches the expected time of completion within an acceptable variance value, and percentage of points during the trip that fall outside the defined geo-fence polygon are within an acceptable variance value.

6. The computer-implemented method of claim 5, wherein defining compliance parameters for route compliance comprises providing one or more of: radius of tolerance for the starting point, radius of tolerance for the ending point, acceptable variance value for time of completion, and acceptable variance value for percentage of points during the trip that fall outside the defined geo-fence polygon in the determined parameters for the typical trip.

7. A system for monitoring route compliance of moving devices, the system comprising a server including a storage database, an analytical engine, and a report service,
wherein the storage database receives and stores
parameters for a typical trip based on job description for at least one moving device,
compliance parameters for route compliance based on the received parameters for the typical trip including a non-uniform rational cubic B-spline representation of the typical path, and
location data for moving devices for a trip for which compliance is to be determined, wherein gathering location data for moving devices for a trip further comprises collecting data using at least one communications device installed in each of the moving devices, and wherein the at least one communications device is capable of transmitting relevant moving device data to the storage database;
wherein the analytics engine
compares parameters including a non-uniform rational cubic B-spline representation of the trip for which compliance is to be determined to the defined compliance parameters, and
determines if the trip for which compliance is to be determined falls within the defined compliance parameters; and
wherein the report service
compiles the data into a report, and
presents it via user interface.

8. The system of claim 7, wherein receiving the parameters for the typical trip comprises receiving data gathered for at least one trip for a job description.

9. The system of claim 7, wherein the typical trip is treated as a representative sample.

10. The system of claim 7, wherein the determined parameters for the typical trip include any one or more of starting point of the trip, ending point of the trip, length of the trip, expected time of completion of the trip, location points on the route.

11. The system of claim 10, wherein the trip is determined to be compliant if: the starting point of the trip is within a radius of tolerance, the ending point of the trip is within a radius of tolerance, the length of the trip matches the expected time of completion, within an acceptable variance value and percentage of points during the trip that fall outside the defined geo-fence polygon are within an acceptable variance value.

12. The system of claim 11, wherein defining compliance parameters for route compliance comprises providing one or more of: radius of tolerance for the starting point, radius of tolerance for the ending point, acceptable variance value for time of completion, and acceptable variance value for percentage of points during the trip that fall outside the defined geo-fence polygon in the determined parameters for the typical trip.

13. A computer program product stored on a non-transitory computer readable medium for monitoring route compliance of moving devices, comprising computer readable instructions for causing a computer to control an execution of an application for monitoring route compliance of moving devices comprising:
determining parameters for a typical trip based on job description;
defining compliance parameters for route compliance based on the determined parameters for the typical trip including a non-uniform rational cubic B-spline representation of the typical path;
gathering location data for moving devices for a trip for which compliance is to be determined, wherein gathering location data for moving devices for a trip further comprises collecting data using at least one communications device installed in each of the moving devices, and wherein the at least one communications device is capable of transmitting relevant moving device data to a database, a data processing system or a combination thereof of a monitoring system;
comparing parameters including a non-uniform rational cubic B-spline representation of the trip for which compliance is to be determined to the defined compliance parameters;
determining if the trip for which compliance is to be determined falls within the defined compliance parameters; and
compiling the data into a report and presenting it via user interface.

14. The computer program product of claim 13, wherein determining parameters for the typical trip comprises gathering data for at least one trip for a job description.

15. The computer-implemented method of claim 13, wherein the typical trip is treated as a representative sample.

16. The computer program product of claim 13, wherein the determined parameters for the typical trip include any one or more of starting point of the trip, ending point of the trip, length of the trip, expected time of completion of the trip, location points on the route.

17. The computer program product of claim 16, wherein the trip is determined to be compliant if: the starting point of the trip is within a radius of tolerance, the ending point of the trip is within a radius of tolerance, the length of the trip matches the expected time of completion, within an acceptable variance value and percentage of points during the trip that fall outside the defined geo-fence polygon are within an acceptable variance value.

18. The computer program product of claim 17, wherein defining compliance parameters for route compliance comprises providing one or more of: radius of tolerance for the starting point, radius of tolerance for the ending point, acceptable variance value for time of completion, and acceptable variance value for percentage of points during the trip that fall outside the defined geo-fence polygon in the determined parameters for the typical trip.

\* \* \* \* \*